US010841088B2

(12) United States Patent
Fan (10) Patent No.: US 10,841,088 B2
(45) Date of Patent: Nov. 17, 2020

(54) SECURE CREDENTIAL GENERATION AND VALIDATION (71) Applicant: Oracle International Corporation, Redwood Shores, CA (US)

(72) Inventor: Xuelei Fan, Brentwood, CA (US)

(73) Assignee: Oracle International Corporation, Redwood Shores, CA (US)

( * ) Notice: Subject to any disclaimer, the term of this patent is extended or adjusted under 35 U.S.C. 154(b) by 95 days.

(21) Appl. No.: 16/222,247

(22) Filed: Dec. 17, 2018

(65) Prior Publication Data

US 2019/0349194 A1 Nov. 14, 2019

Related U.S. Application Data (60) Provisional application No. 62/669,737, filed on May 10, 2018.

(51) Int. Cl.
*H04L 29/06* (2006.01)
*H04L 9/08* (2006.01)
*H04L 9/32* (2006.01)
*H04L 29/08* (2006.01)

(52) U.S. Cl.
CPC .......... *H04L 9/0891* (2013.01); *H04L 9/0861* (2013.01); *H04L 9/0866* (2013.01); *H04L 9/321* (2013.01); *H04L 63/068* (2013.01); *H04L 63/08* (2013.01); *H04L 63/0807* (2013.01); *H04L 63/20* (2013.01); *H04L 67/142* (2013.01); *H04L 67/146* (2013.01)

(58) Field of Classification Search
CPC . H04L 63/0807; H04L 63/068; H04L 67/142; H04L 67/146; H04L 9/0891; H04L 9/0861

See application file for complete search history.

(56) References Cited

U.S. PATENT DOCUMENTS

| | | | | |
|---|---|---|---|---|
| 7,653,938 | B1* | 1/2010 | Touitou | H04L 63/123 713/161 |
| 8,964,975 | B2* | 2/2015 | Daemen | H04L 9/0861 380/277 |
| 2002/0138577 | A1* | 9/2002 | Teng | G06Q 10/10 709/205 |
| 2002/0169961 | A1* | 11/2002 | Giles | H04L 63/10 713/175 |
| 2006/0212706 | A1* | 9/2006 | Jiang | H04L 9/3247 713/176 |
| 2010/0303241 | A1* | 12/2010 | Breyel | G06F 11/1458 380/277 |
| 2012/0214444 | A1* | 8/2012 | McBride | H04W 12/0605 455/411 |

\* cited by examiner

*Primary Examiner* — Thaddeus J Plecha
(74) *Attorney, Agent, or Firm* — Invoke (57) ABSTRACT

Techniques for generating and validating credentials are disclosed. A server generates credentials using only a single current key, up to a threshold number of credentials. The server accepts client connection requests with credentials that were generated using n most recently used keys, including the current key and one or more legacy keys. The server rejects connection requests with credentials that were generated using any other key. When the current key has been used to generate the threshold number of credentials, the server updates the current key to a new key.

20 Claims, 9 Drawing Sheets

SECURE CREDENTIAL GENERATION AND VALIDATION

BENEFIT CLAIMS; RELATED APPLICATIONS; INCORPORATION BY REFERENCE

This application claims the benefit of U.S. Provisional Patent Application 62/669,737, filed May 10, 2018, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to credentials. In particular, the present disclosure relates to validating credentials.

BACKGROUND

In client-server network environments, a server may be vulnerable to a variety of attacks by malicious computer systems. For example, a server may be vulnerable to Denial of Service (DoS) and/or Distributed Denial of Service (DDoS) attacks. In such attacks, one malicious computer system (DoS) or multiple malicious computer systems (DDoS) transmit a series of requests to the server. Each request may be a Transport Layer Security (TLS) handshake request or some other kind of request that demands a response from the server. Each request causes the server to allocate resources, including memory and processing cycles (e.g., to perform cryptographic operations). A high volume of requests can overwhelm the server, resulting in degraded performance and/or system failure. Other kinds of attacks include, but are not limited to, session hijacking and man-in-the-middle attacks. To help prevent these and/or other kinds of attacks, client-server network environments use various credential validation techniques.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview
2. Architectural Overview
3. Generating and Validating Credentials
4. Illustrative Example
5. Miscellaneous; Extensions
6. Hardware Overview
7. Computer Networks and Cloud Networks
8. Microservice Applications

1. General Overview

One or more embodiments include techniques for generating and validating credentials. A server generates credentials using only a single current key, up to a threshold number of credentials. The server accepts client connection requests with credentials that were generated using n most recently used keys, including the current key and one or more legacy keys. The server rejects connection requests with credentials that were generated using any other key. When the current key has been used to generate the threshold number of credentials, the server updates the current key to a new key.

One or more embodiments described in this Specification and/or recited in the claims may not be included in this General Overview section.

2. Architectural Overview

Figure 1:
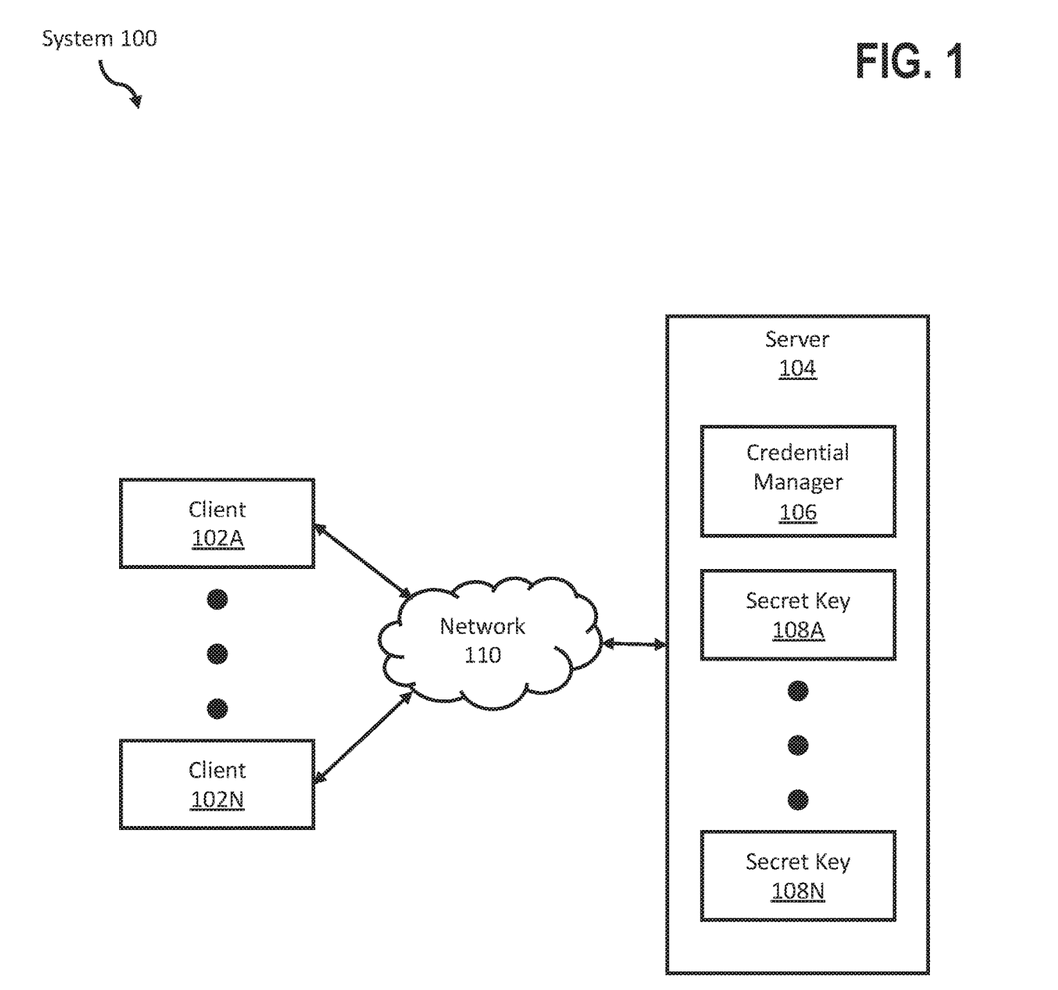
FIG. 1 shows a block diagram that illustrates a system in accordance with an embodiment.

FIG. 1 illustrates a system 100 in accordance with an embodiment. As illustrated in FIG. 1, system 100 includes a server 104 in communication over a network 110 with one or more clients 102A-102N. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, the server 104 is any kind of computer system that supplies data and/or services to clients 102A-102N. For example, the server 104 may be a web server, file server, streaming media server, software-as-a-service (SaaS) server, email server, or any other kind of computer system to which a client 102A-102N may request a connection. The server 104 receives connection requests from one or more clients 102A-102N via the network 110. A client 102A-102N may be any kind of computer system that requests a connection with the server 104. A credential manager 106 refers to hardware and/or software configured to perform operations described herein for generating and validating credentials. Specifically, the credential manager 106 may use one or more secret keys 108A-108N to generate credentials to transmit to the clients 102A-102N and validate credentials received from the clients 102A-102N. Examples of operations for generating and validating credentials are described below.

In an embodiment, the network 110 may be the Internet, an intranet, a local area network (LAN), a virtual private network (VPN), or any other kind of network that permits clients 102A-102N to communicate with a server 104. The clients 102A-102N may communicate with the server 104 using one or more communications protocols. For example, the clients 102A-102N may communicate using a version of Transport Layer Security (TLS). For purposes of this discussion, the clients 102A-102N are assumed to communicate using TLS 1.3or some other protocol, or combination thereof, that allows for an exchange of credentials during a handshake process. Credentials are data structures that the clients 102A-102N and server 104 exchange to help ensure security and reliability of communication. In an embodiment, the credentials are cookies. Cookies are credentials that are generated by the server 104 and retransmitted to the server by the clients 102A-102N. Each cookie is unique to the respective client using that particular cookie. Each cookie uniquely identifies the respective client and includes some state data associated with that client.

In an embodiment, the server 104 and various components thereof are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Generating and Validating Credentials

Figure 2:
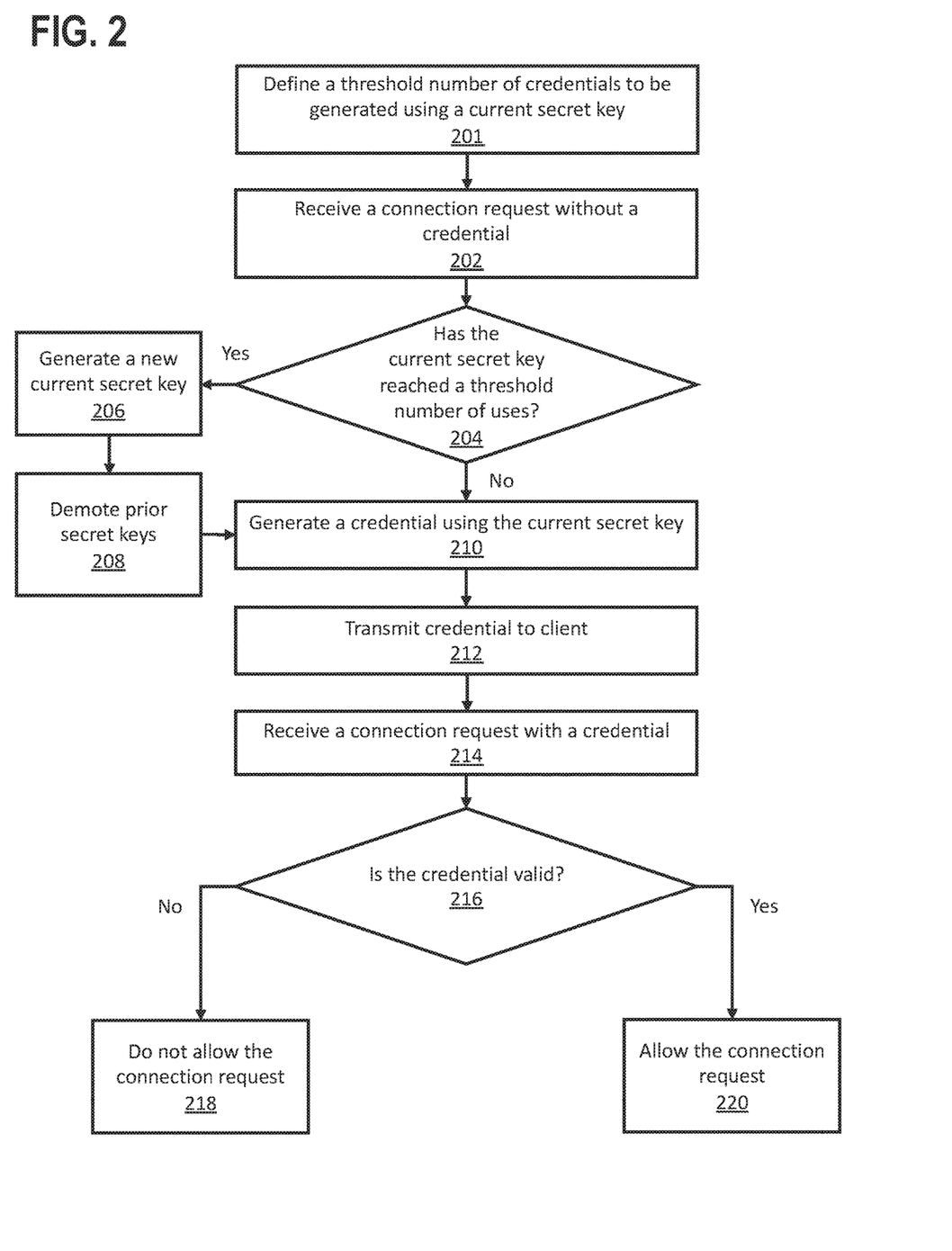
FIG. 2 illustrates a set of operations for generating and validating credentials in accordance with an embodiment.

FIG. 2 illustrates an example set of operations for generating and validating credentials in accordance with an embodiment. One or more operations illustrated in FIG. 2 may be modified, rearranged, or omitted all together. Accordingly, the particular sequence of operations illustrated in FIG. 2 should not be construed as limiting the scope of one or more embodiments. In the following discussion, examples are provided using TLS 1.3 and cookie exchange. However, embodiments should not be considered limited to using TLS 1.3 and/or using cookies as credentials.

In general, in an embodiment, the operations illustrated in FIG. 2 describe a connection policy enforced by a server to ensure that the server only allows connection requests from authorized clients.

In an embodiment, a server (e.g., server 104 of FIG. 1) defines a threshold number of credentials to be generated using a current secret key (Operation 201). As discussed above, the system may store two or more secret keys. In an embodiment, the server only uses a single secret key, referred to as the "current" secret key, to generate credentials. The secret key may be used to generate credentials only a limited number of times (i.e., the threshold number) before a new secret key is required. In general, the more times a particular secret key is used, the more vulnerable the secret key may be to attacks that lead to discovery of the secret key. If a malicious computer system discovers the secret key, the malicious computer system may use the secret key to forge credentials and gain unauthorized access to the server by posing as a valid client. Setting a threshold number of uses for the current secret key may reduce exposure to such attacks. Replacing the current secret key after a certain number of uses may be more secure than replacing the current secret key after a fixed amount of time, because a time-based approach does not take into account higher traffic (and thus greater exposure to attacks) during certain time periods. The threshold number of uses ensures that the server replaces the current secret key after that many uses, which will happen more frequently during high-traffic time periods. Alternatively or in addition, using a threshold number of uses, rather than a time-based approach, reduces system overhead required to generate credentials. Rather than access the system clock to determine whether the current secret key has expired each time credentials are requested, the server simply accesses a running counter of the number of times the current secret key has been used so far.

In an embodiment, the server defines a threshold number of secret key uses based on a source code variable that was compiled into machine-readable code executed by the server. Alternatively or in addition, the server may supply a user interface and define a threshold number of secret key uses based on user input to the user interface (e.g., via a server administration tool presented in the user interface). Alternatively or in addition, the server may define a threshold number of secret key uses based on a property associated with the credentials being generated, such as the length of the secret key. The server may set a higher threshold number of uses for longer secret keys than for shorter secret keys, based on an expectation that longer secret keys are less susceptible than shorter secret keys to malicious discovery during a given time period. The threshold number may be the same for all credentials generated by the server. Alternatively, the server may define different threshold numbers to be enforced in different situations. For example, the server may enforce different threshold numbers for connection requests received using different protocols, on different ports, from different clients and/or categories of clients, during different time periods, or based on any other condition or combination thereof. In an embodiment, the server enforces a threshold number of 2^24 credentials generated using the current secret key. A smaller or larger number may be used.

In an embodiment, the server receives a connection request without a credential (Operation 202). For example, using TLS 1.3, a client sends an initial ClientHello message to the server. The initial ClientHello message does not include a cookie.

In an embodiment, responsive to receiving the connection request, the server determines whether the current secret key has reached the threshold number of uses (Operation 204). The server may maintain a counter and increment the counter after each use, i.e., after generating each credential. If the current secret key has not reached the threshold number of uses, the server generates a credential using the current secret key (Operation 210 discussed below). If the current secret key has reached the threshold number of uses, the server generates a new current secret key (Operation 206). Specifically, the server may call one or more functions, in hardware and/or software, to generate the new current secret key. The function(s) may include a random number generator and/or pseudorandom number generator. Alternatively or additionally, a key derivation function may derive the new secret key from a passphrase. Many different ways of generating a secret key exist.

In an embodiment, the server generates credentials using only a single current secret key. However, the system may still allow connection requests with credentials that were generated using older secret keys. In one example, a client transmits a connection request at time A. The server responds to the client with a credential generated using the current secret key. At time B, after the server responds to the client, the server generates a new secret key to use as the current secret key. After time B, the client attempts to establish a connection with the server, using its credential. However, the client's credential was not generated using the secret key that the server now considers the current secret key. To avoid declining the client's connection request, the server may continue to allow connection requests with credentials that were generated using a prior (or "legacy") secret key that is no longer being used to generate new credentials.

In an embodiment, the system stores only one legacy secret key. When the server generates a new secret key, the server demotes the prior secret keys (Operation 208), i.e., the current secret key and the legacy secret key. The secret key that was previously the current secret key is now considered the legacy secret key. The secret key that was previously the legacy secret key is no longer valid for establishing connections. Maintaining only two secret keys (i.e., one current secret key and one legacy secret key) may help reduce opportunities for a malicious computer system to discover a valid secret key. Alternatively or in addition, maintaining only two secret keys may reduce overhead (e.g., memory and/or processing cycles) associated with validating connection requests, because the server only needs to validate each credential against two options. As noted below, a credential may include a credential version. If the server maintains only two valid secret keys, the credential version refers to either the current secret key or the legacy secret key. The server may designate one of the secret keys as key "zero" and the other secret key as key "one." Which of the secret keys is the current secret key will rotate each time the server generates a new secret key. In one example, a credential manager is in a state where key "one" is the current secret key and key "zero" is the legacy secret key. When the server generates a new secret key, the server replaces the legacy secret key. Now, key "zero" is the current (i.e., newly generated) secret key and key "one" is the legacy (formerly current) secret key. Alternatively, the server may maintain multiple legacy secret keys, with the demotion process resulting in the oldest legacy key being discarded whenever the server generates a new secret key.

In an embodiment, the server generates a credential using the current secret key (Operation 210). The credential may be a cookie or any other kind of credential. The credential may include multiple components. In an embodiment, the credential includes one or more of the components described below.

In an embodiment, the credential includes a cipher suite that indicates the cyroptographic operation(s) to use for communication between the client and the server, as negotiated by the client and the server. The server may select the cipher suite from a set of client-supported cipher suites included in the initial connection request.

In an embodiment, the credential includes a credential version. The credential version indicates which secret key was used to generate the credential. If the server only supports two valid secret keys at a time (i.e., one current secret key and one legacy secret key), the credential version may indicate which of the two secret keys was used to generate the credential. For example, the credential version may be a single bit that has a value of zero or one. In general, the credential version may be any combination of characters (e.g., numbers, letters, etc.) that indicate which secret key was used to generate the credential.

In an embodiment, the credential includes a secure message digest of the connection request's header. The secure message digest may be a hash code generated using the cryptographic algorithm(s) indicated by the cipher suite. Because the connection request's header does not change from one request to the next, the secure message digest helps a server to reliably verify, using the cipher suite and the appropriate secret key indicated by the credential version, the validity of a given credential received from a client.

In an embodiment, the credential includes a message digest of the connection request. The message digest may be a hash code generated using the cryptographic algorithm(s) indicated by the cipher suite. Because the message digest is not based solely on the connection request's header, the message digest may change from one request to another.

In an embodiment, the server transmits the credential to the client (Operation 212). For example, using TLS 1.3, the server may transmit the credential to the client in a HelloRetryRequest message. When the server transmits the credential to the client, the server may not store any information associated with the connection request. In particular, the server may not store a copy of the credential itself. The server generates the credential and transmits the credential to the client, and the client uses the credential in a subsequent connection request to the server. In effect, the server may be considered "stateless" in the sense that it does not store, on the server side, any state associated with individual connection requests. A stateless server may require less system overhead to operate than a server that maintains copies of connection state data on the server side. Alternatively or in addition, a stateless server may avoid synchronization problems associated with multithreaded and/or distributed environments, where one thread does not yet have access to state data generated by another thread.

In an embodiment, the server receives another connection request from the client, this time with a credential (Operation 214). For example, using TLS 1.3, the connection request may be another ClientHello message, transmitted by the client responsive to a HelloRetryRequest message. To establish a valid connection, the client must transmit back the exact credential that the server generated and transmitted to the client. The connection request may be different, but the credential itself must be identical. Requiring the client to return the credential helps mitigate against various kinds of attacks. For example, in some DoS attacks, a malicious computer system uses a spoofed Internet Protocol (IP) address. In those cases, the malicious computer system will never receive the credential from the server and therefore cannot return the credential to the server to establish a valid connection.

In an embodiment, the server determines whether the credential received from the client is valid (Operation 216). Validating the credential may involve one or more validation operations. The server may determine whether the credential is null or has an unexpected length, in which case the credential is invalid. Alternatively or in addition, the server may determine whether the credential includes a valid cipher suite. For example, if the cipher suite is missing, or is an invalid length, the credential is invalid. Alternatively or in addition, the server may confirm that the secure message digest is valid. Specifically, the server may use the cipher suite and the appropriate secret key to independently generate the secure message digest. If the server's result does not match what is stored in the client-provided credential, then the credential is invalid. Other validation techniques and/or combinations thereof may be used.

In an embodiment, if the credential is valid, the server allows the connection request (Operation 220). Additional operations may still be required to establish the connection. For example, TLS 1.3 defines a handshake protocol. If the server determines that the credential is valid, the server may proceed with the remaining steps in the handshake protocol.

In an embodiment, if the credential is invalid, the server does not allow the connection request (Operation 218), preventing the client from establishing an unauthorized connection. The server may explicitly reject the connection request by transmitting a message to the client indicating that the connection request was rejected. Alternatively, the server may simply terminate communication with the client without transmitting any further message to the client. Alternatively, the server may treat the most recent connection request as an initial connection request (i.e., as received in Operation 202 described above) and generate a new credential to transmit to the client. As described above, generating a new credential may require generating a new current secret key. Alternatively or in addition, the server may log an event indicating that it received an invalid credential. Large numbers of such events may trigger an alarm indicating that a DoS attack or DDoS attack is underway. In any event, a client will not be permitted to establish a connection with the server if the client does not supply a valid credential that was generated by the server as described above.

4. Illustrative Example

FIGS. 3A-3F illustrate an example system 300 in block diagram form, in accordance with one or more embodiments. The example shown in FIGS. 3A-3F is provided for illustrative purposes only and should not be construed as limiting one or more embodiments.

Figure 3A:
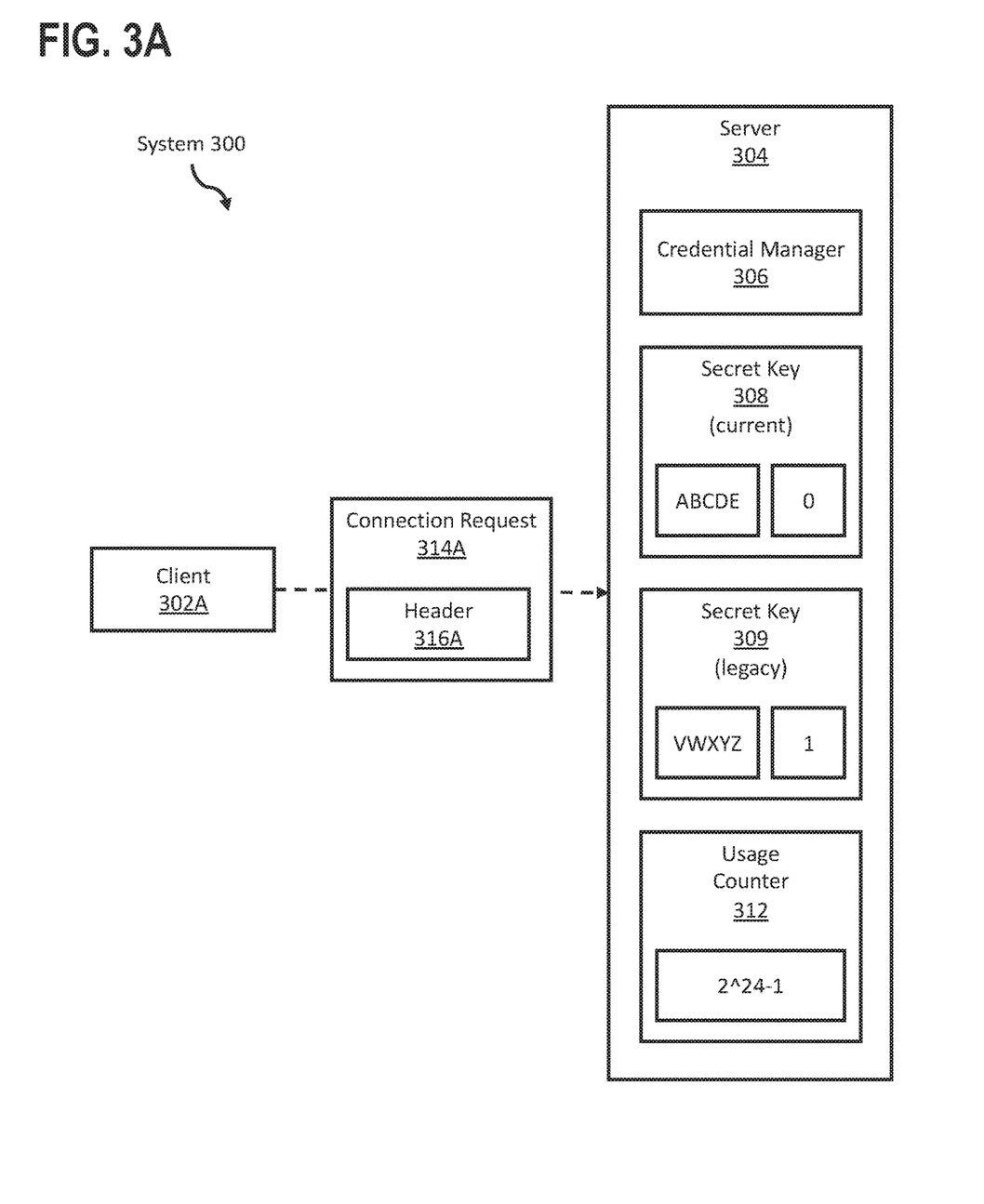
FIGS. 3A-3F illustrate an example in block diagram form, in accordance with an embodiment.

As illustrated in FIG. 3A, a client 302A transmits a connection request 314A, without a credential, to a server 304 via a network (not shown). The connection request 314A includes a header 316A. The server 304 includes a credential manager 306. The credential manager 306 manages two secret keys: a current secret key 308 and a legacy secret key 309. Each secret key has a value and a bit (zero or one) corresponding to a secret key version. For ease of illustration, the secret keys in this example have values defined as five-character sequences ("ABCDE," "FGHIJ," etc.). In practice, a secret key would be longer and more complex. In FIG. 3A, the current secret key 308 has a value of "ABCDE" and a version bit equal to zero. The legacy secret key 309 has a value of "VWXYZ" and a version bit equal to one. In addition, the credential manager 306 maintains a usage counter 312 corresponding to the number of times the current secret key 308 has been used to generate credentials. In this example, the threshold number of times each secret key can be used to generate credentials is 2^24. At the time of the connection request 314A illustrated in FIG. 3A, the usage counter 312 has a value of one less than the threshold number of uses, meaning the current secret key 308 is valid for only one more use.

Figure 3B:
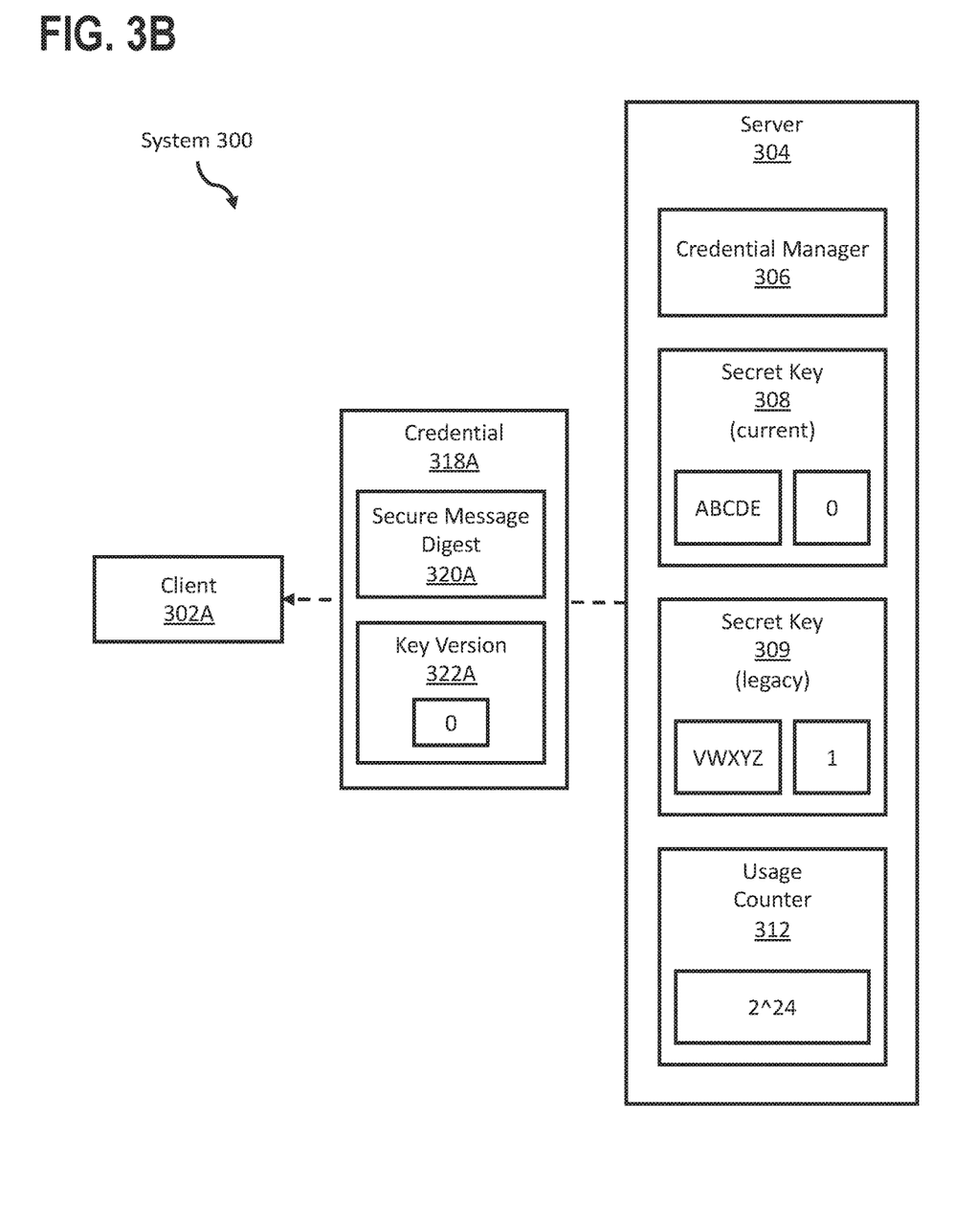

As illustrated in FIG. 3B, responsive to the connection request 314A, the credential manager 306 generates a credential 318A. The credential 318A includes a secure message digest 320A, which is a hash code of the header 316A generated using the current secret key 308. In addition, the credential 318A includes a key version 322A, corresponding to the version of the current secret key 308 used to generate the credential 318A. The server 304 transmits the credential 318A to the client 302A. The credential manager 306 increments the usage counter to 2^24, which is the threshold number of uses.

Figure 3C:
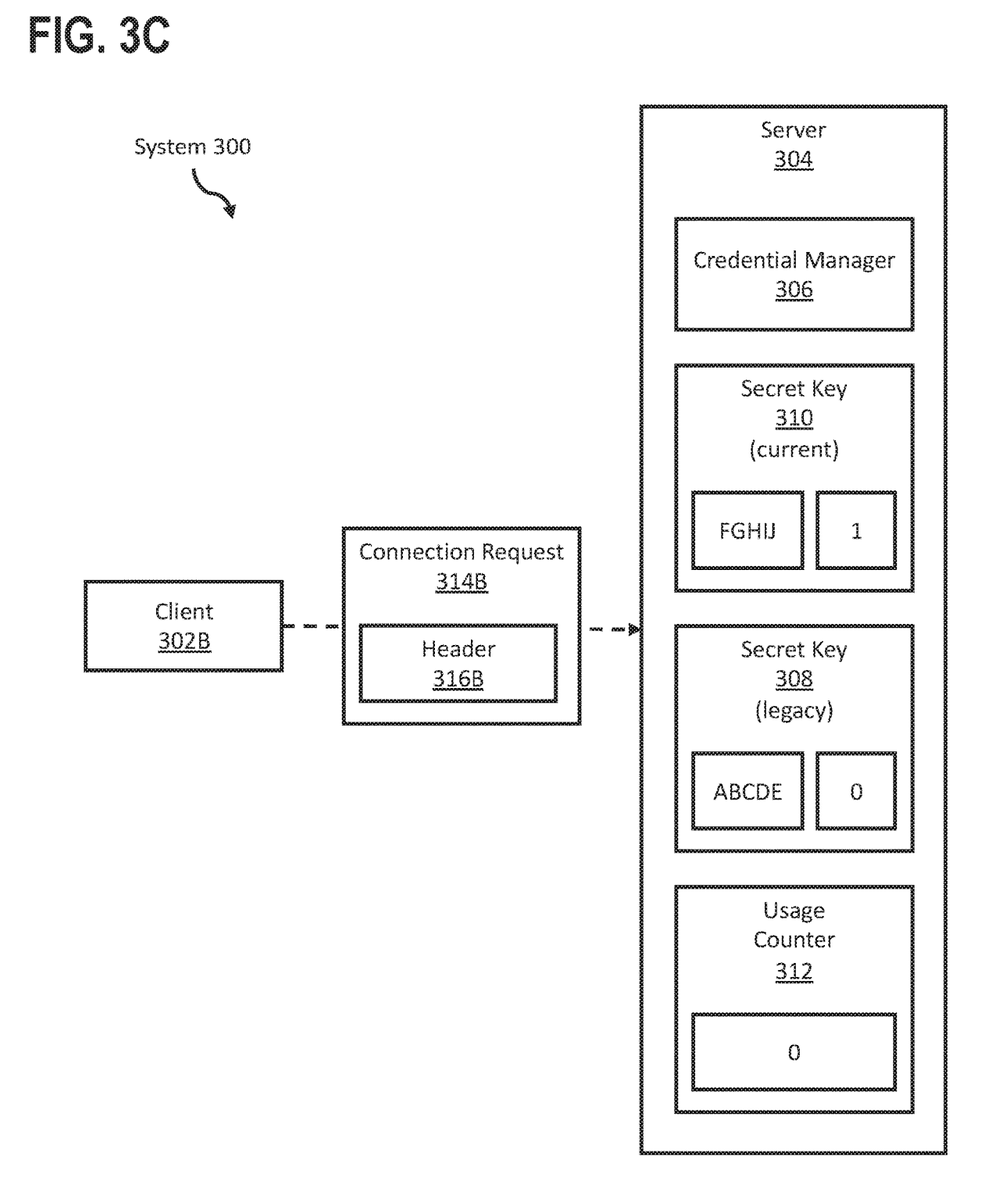

As illustrated in FIG. 3C, because the usage counter 312 reached the threshold number of uses, the credential manager 306 generates a new current secret key 310, demotes the prior current secret key 308 to a legacy secret key, and resets the usage counter 312 to zero. The new current secret key 310, which has not yet been used, has a value of "FGHIJ" and a version bit equal to one. When another client 302B transmits a connection request 314B to the server 304, the credential manager 306 will use the new current secret key 310 rather than the legacy secret key 308.

Figure 3D:
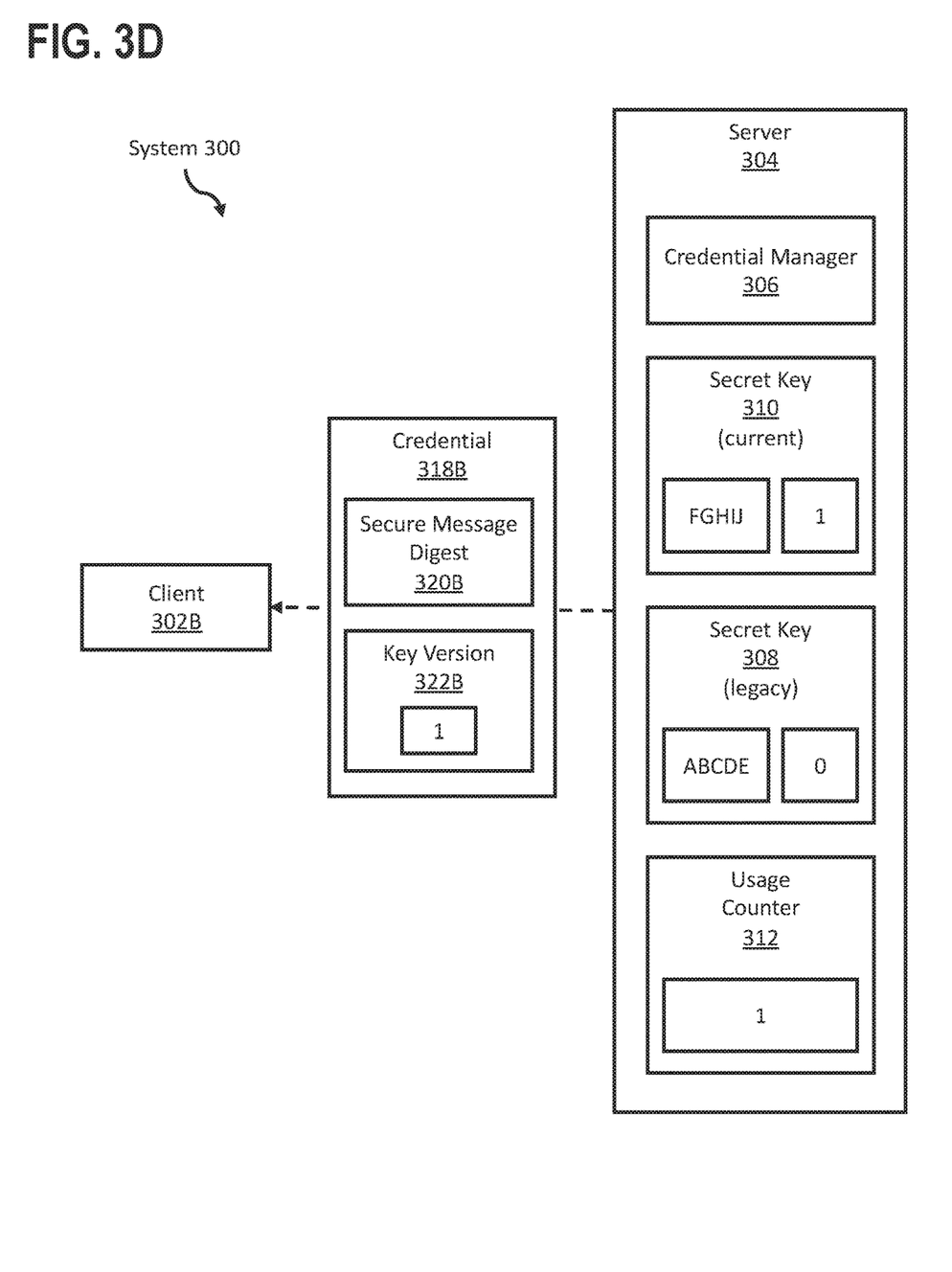

As illustrated in FIG. 3D, responsive to the connection request 314B, the credential manager 306 generates a credential 318B. The credential 318B includes a secure message digest 320B, which is a hash code of the header 316B generated using the current secret key 310. In addition, the credential 318B includes a key version 322B, corresponding to the version of the current secret key 310 used to generate the credential 318B. The server 304 transmits the credential 318B to the client 302B. The credential manager 306 increments the usage counter to 1, indicating that the current secret key 310 has been used once.

Figure 3E:
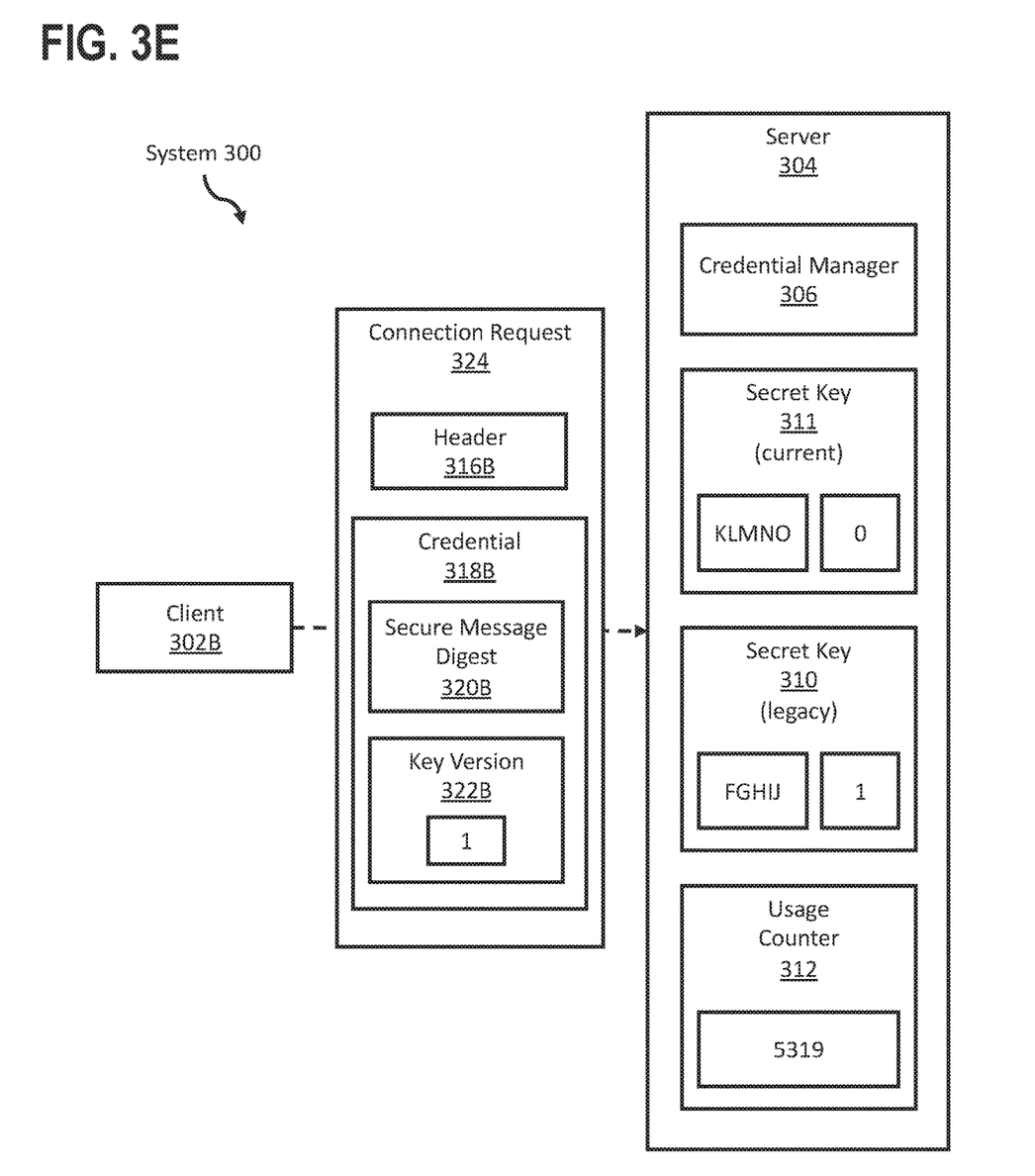

As illustrated in FIG. 3E, client 302B transmits another connection request 324 to the server 304. The connection request 324 includes a header 316B, which is identical to the header 316B in client 302B's initial connection request 314B. In addition, the connection request 324 includes a credential 318B. The credential 318B in the connection request 324 is identical to the credential that the server 304 previously transmitted to the client 302B, including the secure message digest 320B and key version 322B. The connection request 324 arrives at a time when the secret key 310 used to generate the credential 318B is now the legacy secret key. When the secret key 310 reached the threshold number of uses, the credential manager 306 demoted the secret key 310 to a legacy secret key, and the prior legacy secret key 308 ceased to be valid. The secret key 310 is still valid for accepting connection requests, but is no longer used to generate new credentials.

In FIG. 3E, to validate the connection request 324, the credential manager 306 retrieves the key version 322B from the credential 318B included in the connection request 324. The key version 322B has a value of one. The credential manager 306 uses the legacy secret key 310, which also has a version bit equal to one, to generate a hash code of the header 316B. Because secret key 310 is the same secret key 310 that was used to generate the secure message digest 320B, the resulting hash code matches the secure message digest 320B in the connection request 324. Therefore, the server 304 allows the connection request 324.

Figure 3F:
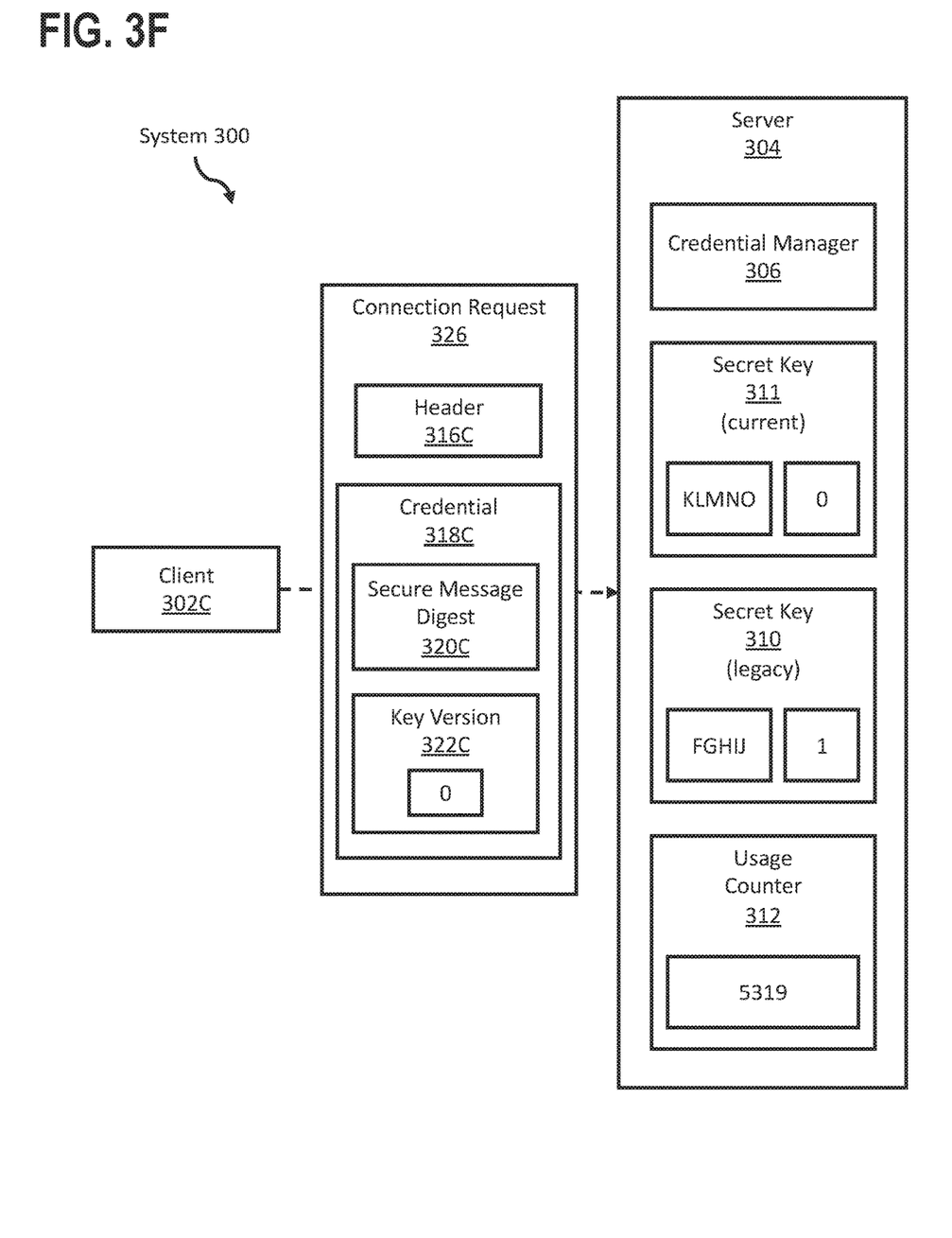

As illustrated in FIG. 3F, a client 302C transmits a connection request 326 to the server 304. In this example, client 302C is a malicious client that has somehow discovered secret key 308 and is attempting to use secret key 308 to spoof a valid connection request. The connection request 326 includes a header 316C and a credential 318C. The credential 318C includes a secure message digest 320C that is a hash code of the header 316C generated using the discovered secret key 308. In addition, the credential 318C includes a key version 322C that matches the key version of secret key 308. However, in FIG. 3F, the connection request 326 arrives at a time when secret key 308 is no longer valid; secret key 308 is no longer either the current secret key or the legacy secret key.

In FIG. 3E, to validate the connection request 326, the credential manager 306 retrieves the key version 322C from the credential 318C included in the connection request 326. The key version 322C has a value of zero. The credential manager 306 uses the current secret key 311, which also has a version bit equal to zero, to generate a hash code of the header 316C. Because secret key 311 is not the same secret key 308 that was used to generate the secure message digest 320C, the resulting hash code does not match the secure message digest 320C in the connection request 326. Therefore, the server 304 does not allow the connection request 326. In this example, the credential manager 306 has effectively enforced a security policy that helps protect against malicious attempts to spoof valid connection requests. By the time a malicious entity discovered the secret key 308, the secret key 308 was no longer valid, because the server 304 had generated enough new credentials that the secret key 308 was no longer either the current secret key or the legacy secret key.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
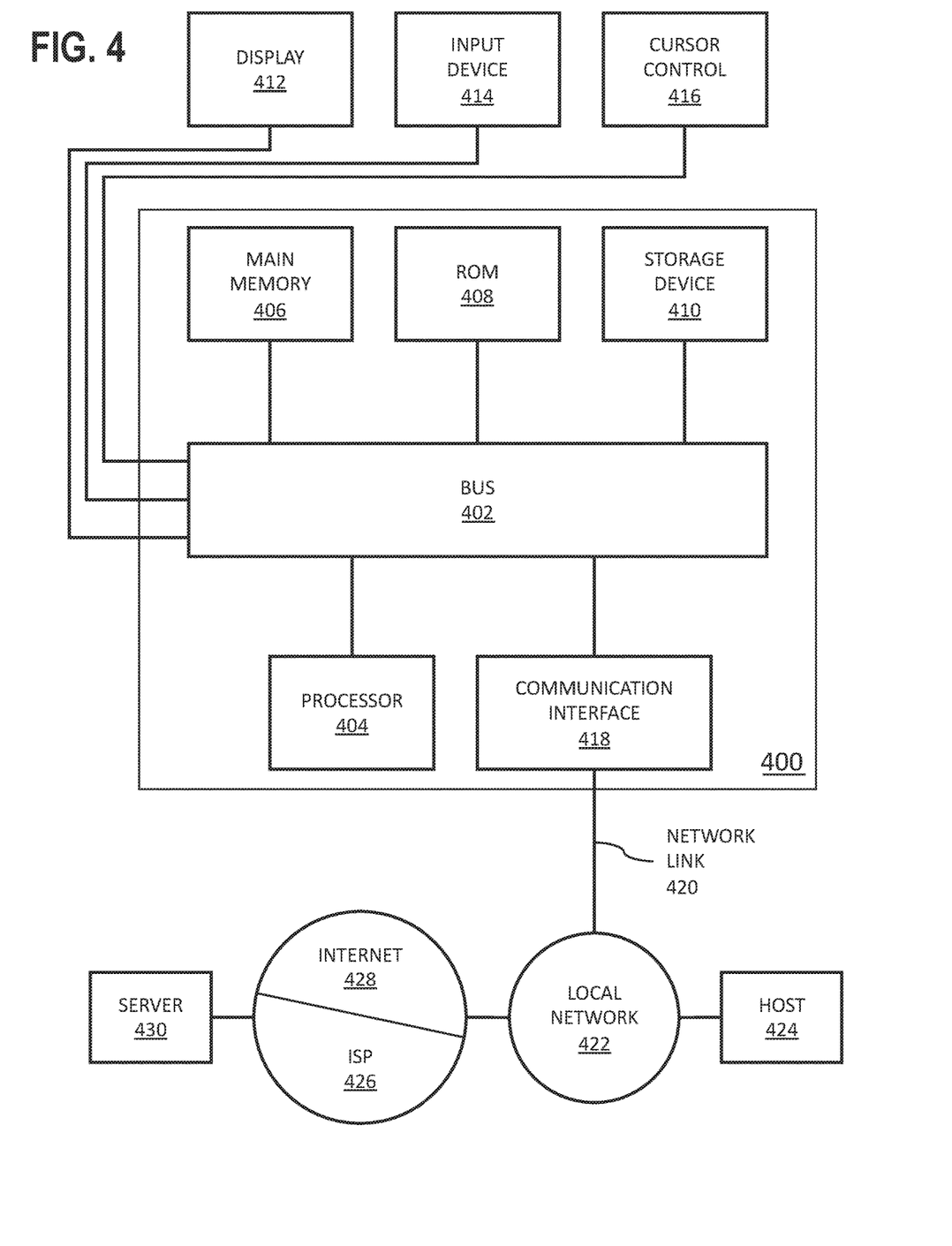
FIG. 4 shows a block diagram that illustrates a computer system in accordance with an embodiment.

For example, FIG. 4 is a block diagram that illustrates a computer system 400 upon which one or more embodiments of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. Computer Networks and Cloud Networks

In an embodiment, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In an embodiment, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In an embodiment, a plugged-in microservice application may expose actions to the microservices manager. The exposed actions may receive, as input, data or an identification of a data object or location of data, that causes data to be moved into a data cloud.

In an embodiment, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In an embodiment, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   generating, by a server during any particular time period in a plurality of time periods, credentials using only a single current key, the single current key to be used for generating up to a defined threshold number of credentials;
   enforcing, by the server during the particular time period, a connection policy by which:
      the server accepts a first set of client connection requests comprising credentials generated using only n most recently used keys, the n most recently used keys comprising (a) the single current key and (b) a particular prior key that was used prior to the single current key to generate credentials, and
      the server does not accept a second set of client connection requests comprising credentials generated using an n+1th key that was used for generating credentials prior to the n most recently used keys;

monitoring, by the server during the particular time period, a number of credentials generated by the single current key; and responsive to determining that the number of credentials generated by the single current key during the particular time period meet the defined threshold number of credentials, updating the current key to a new key.

2. The one or more media of claim 1, further storing instructions which, when executed by one or more processors, cause:

receiving, by the server from a client, a first connection request without any credential;

generating, by the server responsive to the first connection request, a particular credential for the client;

transmitting, by the server, the particular credential to the client;

receiving, by the server from the client, a second connection request comprising the particular credential that was generated by the server; and determining, by the server, whether to accept the second connection request based on the particular credential.

3. The one or more media of claim 2, wherein determining whether to accept the second connection request comprises:

generating, by the server, a first secure message digest based on contents of the particular credential received from the client; and comparing the first secure message digest with a second secure message digest stored in the particular credential.

4. The one or more media of claim 1, further storing instructions which, when executed by one or more processors, cause:

rejecting, by the server during the particular time period, a third set of client connection requests comprising credentials generated using any key other than the n most recently used keys.

5. The one or more media of claim 1, wherein each of the credentials generated by the server comprises a credential version indicating which of the n most recently used keys was used to generate the credential.

6. The one or more media of claim 1, wherein n is two.

7. The one or more media of claim 1, wherein each of the credentials generated by the server comprises a cookie.

8. A system comprising:

at least one device including a hardware processor;

the system being configured to perform operations comprising:

generating, by a server during any particular time period in a plurality of time periods, credentials using only a single current key, the single current key to be used for generating up to a defined threshold number of credentials;

enforcing, by the server during the particular time period, a connection policy by which:

the server accepts a first set of client connection requests comprising credentials generated using only n most recently used keys, the n most recently used keys comprising (a) the single current key and (b) a particular prior key that was used prior to the single current key to generate credentials, and the server does not accept a second set of client connection requests comprising credentials generated using an n+1th key that was used for generating credentials prior to the n most recently used keys;

monitoring, by the server during the particular time period, a number of credentials generated by the single current key; and responsive to determining that the number of credentials generated by the single current key during the particular time period meet the defined threshold number of credentials, updating the current key to a new key.

9. The system of claim 8, the operations further comprising:

receiving, by the server from a client, a first connection request without any credential;

generating, by the server responsive to the first connection request, a particular credential for the client;

transmitting, by the server, the particular credential to the client;

receiving, by the server from the client, a second connection request comprising the particular credential that was generated by the server; and determining, by the server, whether to accept the second connection request based on the particular credential.

10. The system of claim 9, wherein determining whether to accept the second connection request comprises:

generating, by the server, a first secure message digest based on contents of the particular credential received from the client; and comparing the first secure message digest with a second secure message digest stored in the particular credential.

11. The system of claim 8, the operations further comprising:

rejecting, by the server during the particular time period, a third set of client connection requests comprising credentials generated using any key other than the n most recently used keys.

12. The system of claim 8, wherein each of the credentials generated by the server comprises a credential version indicating which of the n most recently used keys was used to generate the credential.

13. The system of claim 8, wherein n is two.

14. The system of claim 8, wherein each of the credentials generated by the server comprises a cookie.

15. A method comprising:

generating, by a server during any particular time period in a plurality of time periods, credentials using only a single current key, the single current key to be used for generating up to a defined threshold number of credentials;

enforcing, by the server during the particular time period, a connection policy by which:

the server accepts a first set of client connection requests comprising credentials generated using only n most recently used keys, the n most recently used keys comprising (a) the single current key and (b) a particular prior key that was used prior to the single current key to generate credentials, and the server does not accept a second set of client connection requests comprising credentials generated using an n+1th key that was used for generating credentials prior to the n most recently used keys;

monitoring, by the server during the particular time period, a number of credentials generated by the single current key; and responsive to determining that the number of credentials generated by the single current key during the particular time period meet the defined threshold number of credentials, updating the current key to a new key;

wherein the method is performed by at least one device comprising a hardware processor.

16. The method of claim 15, further comprising:

receiving, by the server from a client, a first connection request without any credential;

generating, by the server responsive to the first connection request, a particular credential for the client;

transmitting, by the server, the particular credential to the client;

receiving, by the server from the client, a second connection request comprising the particular credential that was generated by the server; and determining, by the server, whether to accept the second connection request based on the particular credential.

17. The method of claim 16, wherein determining whether to accept the second connection request comprises:

generating, by the server, a first secure message digest based on contents of the particular credential received from the client; and comparing the first secure message digest with a second secure message digest stored in the particular credential.

18. The method of claim 15, further comprising:

rejecting, by the server during the particular time period, a third set of client connection requests comprising credentials generated using any key other than the n most recently used keys.

19. The method of claim 15, wherein each of the credentials generated by the server comprises a credential version indicating which of the n most recently used keys was used to generate the credential.

20. The method of claim 15, wherein n is two.

* * * * *